United States Patent Office 3,112,321
Patented Nov. 26, 1963

3,112,321
PROCESS FOR PREPARING BICYCLIC DIQUATERNARY DIBROMIDES AND DINITRATES
William W. Levis, Jr., Wyandotte, and Eugene A. Weipert, Taylor, Mich., assignors to Wyandotte Chemicals Corporation, Wyandotte, Mich., a corporation of Michigan
No Drawing. Filed Apr. 17, 1961, Ser. No. 103,249
11 Claims. (Cl. 260—268)

This invention relates to a process for preparing bicyclic diquaternary dibromides. In a more specific aspect, this invention relates to a process for preparing bicyclic diquaternary dibromides and for reacting said dibromides with nitric acid to produce the corresponding dinitrates in high conversion and high purity.

It is disclosed in the prior art that 1,4-diazabicyclo-[2.2.2]octane dimethobromide can be prepared by directly reacting 1,4-dimethylpiperazine with ethylene dibromide at elevated temperatures. The procedure is described by F. G. Mann et al. in J. Chem. Soc., 1949, at page 2298 et seq. and in J. Chem. Soc., 1954, at page 4476 et seq.; the chemical equation for the reaction is as follows:

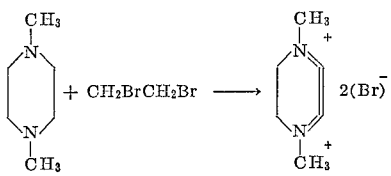

The dimethobromide can be converted to the nitrate salt by reacting the bromide with nitric acid.

It has been observed, however, that the direct reaction of a 1,4-dialkylpiperazine and ethylene dibromide results in a reaction product mixture which requires extensive purification in order to obtain purified dimethobromide. The degree of conversion to the purified product, based upon piperazine, is low. In order to improve the quality of and conversion to dimethobromide, the reaction of 1,4-dimethylpiperazine and ethylene dibromide was carried out in ethanol. Although the quality and conversion were substantially improved by carrying out the reaction in an organic solvent, nevertheless, it was necessary to isolate the bromide salt from the solvent, prepare an aqueous solution thereof and then react the bromide salt solution with aqueous nitric acid in order to obtain the bicyclic diquaternary dinitrate.

One would not expect that water could be used as a solvent in the reaction between a 1,4-dialkylpiperazine and ethylene dibromide because it is known that ethylene dibromide will hydrolyze in an aqueous alkaline solution into ethylene glycol and bromide salts.

In contrast to the teachings of the prior art, we have now discovered that ethylene dibromide will react with an aqueous solution of alkylated piperazine and that the reaction product is an aqueous solution of bicyclic diquaternary dibromide in high conversion.

We have found, further, that the resulting aqueous bicyclic diquaternary dibromide crude reaction product can be prepared in a remarkably efficient manner for subsequent reaction with nitric acid by adding magnesium or calcium oxide to said dibromide crude reaction product. Magnesium and calcium oxide have been found to not only neutralize effectively acidic byproducts but to be easily removed from the final nitric acid reaction product so that a high purity final product is obtained. Magnesium oxide is specially preferred because it reacts with nitric acid to produce magnesium nitrate which can be separated most effectively from the final desired dinitrate product by crystallization of the dinitrate while the magnesium nitrate remains in solution.

Finally, we have found that a mixture of crude dibromide reaction product treated as stated above can be reacted with aqueous nitric acid with exceedingly high efficiency to produce corresponding diquaternary dinitrates by concentrating the mixture by distillation, preferably under reduced pressure so as to avoid decomposition of the dibromide diquaternary salt, separating undissolved metal oxide and mixing with heated aqueous nitric acid.

In accordance with this invention, these new processes are combined so as to provide an over-all aqueous process for preparing bicyclic diquaternary dinitrates according to the formula:

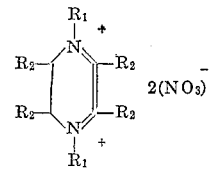

wherein $R_1$ is a member selected from the group consisting of methyl and ethyl radicals and $R_2$ is a member selected from the group consisting of hydrogen, methyl and ethyl radicals and at least two $R_2$ substituents are hydrogen radicals, which comprises heating and mixing water and an alkyl-substituted piperazine according to the formula:

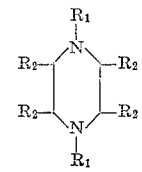

wherein $R_1$ and $R_2$ correspond to the radicals set forth hereinabove and at least two $R_2$ substituents are hydrogen radicals with about the stoichiometric amount of a 1,2-dihaloethane which can be ethylene dichloride or ethylene dibromide, at a temperature from about 70° to 100° C., neutralizing acidic products formed within said aqueous reaction mixture with magnesium or calcium oxide, heating and distilling the resulting aqueous reaction mixture including metal oxide until the solute concentration of the distilland is about 60 to 70 weight percent, separating undissolved metal oxide from the distilland, mixing said distilland with an aqueous nitric acid solution maintained at a temperature from about 65° to 90° C., and isolating a bicyclic diquaternary dinitrate therefrom.

The alkylated piperazines which are employed in the process conform to the formula:

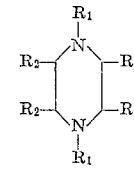

wherein $R_1$ is a methyl or ethyl radical and $R_2$ is a hydrogen, methyl or ethyl radical providing, however, that at least two $R_2$ substituents are hydrogen radicals. Typical alkylated piperazines include, for example, 1,4-dimethylpiperazine, 1,2,4-trimethylpiperazine, 1,2,3,4-tetramethylpiperazine, 1,2,4,5-tetramethylpiperazine, 1,2,4,6-tetramethylpiperazine, 1,4-diethylpiperazine, 1,4-diethyl-2-methylpiperazine, 1,2,4-triethylpiperazine, 1,2,4,5-tetraethylpiperazine, 1,4-diethyl-2,5-dimethylpiperazine and the like.

The amount of water which is employed in the reaction with ethylene dibromide or dichloride is from about 7 to 30 mols of water per mol of alkylated piperazine and, preferably, from about 12 to 15 mols of water per mol of alkylated piperazine. The water can be either tap water or distilled water.

The aqueous solution of alkylated piperazine is agitated and heated and maintained at a temperature from about 70° to 100° C. To this agitated solution of alkylated piperazine, there is added a 1,2-dihaloethane, which can be either ethylene dichloride or ethylene dibromide, in about the stoichiometric proportion based upon the alkylated piperazine. Ethylene dibromide is preferred however, because this compound reacts more readily and rapidly with the alkylated piperazine, thereby reducing the extent of side reactions and when the product therefrom is reacted with nitric acid there is obtained a diquaternary dinitrate in high conversion and which assays is excess of 99%. Although excess quantities of either reactant can be used, it is preferable, from an economic viewpoint, to react the alkylated piperazine and dihaloethane in approximately stoichiometric proportions. The mixture of aqueous alkylated piperazine and ethylene dibromide or dichloride produces two layers, an oil layer and a water layer, and the stoichiometric reaction is complete when the two phases disappear and a homogenous solution is produced.

During the course of the reaction between the alkylated piperazine and dihaloethane, acidic products, such as piperazine hydrohalides, are formed. Since these acidic materials constitute contaminants in the final product, it is desirable to remove these materials prior to interaction of the halide salt with nitric acid. The acidic materials are most advantageously neutralized with magnesium oxide, but calcium oxide can also be used. The metal oxide can be added to the aqueous solution before, simultaneously with, or after the dihaloethane addition thereto. It is preferable to add the metal oxide to the reaction mixture after the dihaloethane has been consumed in the reaction with aqueous alkylated piperazine. The metal oxide is added in an amount which corresponds to about 0.1 to 2.0 percent of the weight of the aqueous reaction mixture and, preferably, in an amount which corresponds to about 0.3 to 1.0 percent of the weight of the aqueous reaction mixture.

The diquaternary dibromide reaction product containing metal oxide is heated and distilled to remove volatiles and concentrate the solution. The volatiles which are removed include alkylated piperazine and other unreacted starting materials. The distillation is carried out at a pressure from about 25.0 mm. of mercury up to about atmospheric pressure and is continued until the solute concentration of the distilland is about 60 to 70 weight percent. Although this distillation step can be carried out at atmospheric pressure, it is preferable to carry out the distillation under reduced pressure so as to avoid decomposition of the quaternary salt. A preferred pressure is from about 25.0 to 250.0 mm. of mercury.

After the aqueous reaction product mixture has been concentrated by distillation, it is separated from undissolved magnesium oxide, for example, by filtration and passed into an agitated nitric acid solution maintained at a temperature from about 65° to 90° C. The aqueous nitric acid solution contains from about 50 to 70 weight percent nitric acid and, preferably, about 65–70 weight percent nitric acid. The nitric acid solution generally contains from about 3.5 to 6 mols of nitric acid per mol of alkylated piperazine starting reactant and, preferably, 4 to 5 mols of nitric acid per mol of alkylated piperazine reactant.

The broad temperature range for the reaction with aqueous nitric acid is about 65° to 90° C. because bromine liberated from the diquaternary dibromide during the reaction forms a solid molecular complex with the diquaternary dibromide at temperatures below about 65° C. and because gases are evolved so rapidly during the reaction at temperatures above about 90° C. that the reaction becomes very difficult to control. The most effective temperature range for the reaction with aqueous nitric acid is about 70° to 80° C.

The reaction product mixture from the interaction of the dihalide salt and nitric acid is heated and distilled to strip volatiles and concentrate the reaction product solution. Distillation is continued until the temperature of the distilland reaches about 125° C. at atmospheric pressure.

The dinitrate salt product can be precipitated at this point by simply cooling to at least below the boiling point of a liquid precipitant, below 80° C. in the case of isopropanol, preferably to below about 10° C., and then adding the liquid precipitant, such as isopropanol. The dinitrate salt product obtained thereby contains about 1 to 1.5 weight percent of free, titratable nitric acid but such a relatively impure product is a useful nematocide.

If the dinitrate salt is desired in a highly purified state, it can be crystallized from solution using methanol or ethanol or a mixture of methanol and ethanol and a liquid precipitant containing at least about 50 weight percent of methanol or ethanol based on the weight of the mixture.

If methanol or ethanol or methanol-ethanol mixtures alone and cooling to below about 10° C. are used for the purification, a highly pure, crystalline product is obtained although the recovery is reduced due to the solubility of the dinitrate in such alcohols even at low temperatures.

The liquid precipitants that can be used include liquid alkanes or alkanols having 3 to 10 carbon atoms per molecule, and other liquid hydrocarbons, ketones and esters, such as benzene, acetone, methylethyl ketone, methylisobutyl ketone, dimethylformamide, n-propanol, isopropanol, n-butanol, isobutanol, hexanols, decanols, pentane, heptane, decane and the like.

We have obtained the highest recovery of high purity product by a two-step solution-crystallization procedure in which methanol, ethanol or mixtures thereof are added to the concentrated dinitrate product to solubilize the dinitrate completely. A liquid precipitant is then added and the mixture is cooled to below about 10° C. An especially effective system involved the addition, first, of methanol and, then, isopropanol in which the proportion of methanol equalled 70 weight percent of the total alcohols used and the proportion of isopropanol equalled 30 weight percent of the weight of the total alcohols used.

The amount of total liquid solvent and precipitant used to purify the dinitrate salt has an important effect on the recovery of the dinitrate salt obtained by the over-all process. At least about 300 grams of liquid solvent and precipitant per mol of dibromide salt used to prepare the dinitrate salt should be used. For example, about 300 grams of a mixture of methanol and isopropanol per mol of the dibromide salt, in which there is 70 weight percent methanol and 30 weight percent isopropanol in the mixture of alcohols, are required to achieve a recovery of 85% or higher of the dinitrate salt. Higher amounts, such as up to 450 grams of the mixed alcohols per mol of dibromide salt, give recoveries of over 97% employing highly purified, anhydrous dibromide salt but the reactor volume requirements and alcohol costs go up sharply as the total amount of alcohol is increased.

The crystals are separated from the solvent-liquid precipitant system by filtration and dried at about 80° to 90° C. The conversion when 1,2,4-trimethylpiperazine is an initial reactant is from about 71 to 78 percent based upon the trimethylpiperazine starting reactant. The product is obtained in a high purity and assays in excess of 99%.

Typical products which can be prepared in accordance with the method of the invention include, for example, 2 - methyl-1,4-diazabicyclo[2.2.2]octane dimethonitrate; 2-ethyl-1,4-diazabicyclo[2.2.2]octane dimethonitrate; 1,4- diazabicyclo[2.2.2]octane dimethonitrate; 2,5-dimethyl-1,4 - diazabicyclo[2.2.2]octane dimethonitrate; 2,6-dimethyl-1,4-diazabicyclo[2.2.2]octane dimethonitrate; 2-methyl - 1,4-diazabicyclo[2.2.2]octane diethonitrate, and 2,5-dimethyl-1,4-diazabicyclo[2.2.2]octane diethonitrate.

The bicyclic diquaternary dinitrates are effective as nematocides and it has been found that an aqueous solution containing 90 parts per million of 2-methyl-1,4-diazabicyclo [2.2.2] octane dimethonitrate is one hundred percent effective against Panagrellus species.

The following examples further illustrate the invention.

Example I

This example illustrates an aqueous process for preparing 2-methyl-1,4-diazabicyclo[2.2.2]octane dimethonitrate wherein the initial reactants are an aqueous solution of 1,2,4-trimethylpiperazine and ethylene dibromide.

985 grams (5.25 mols) of ethylene dibromide and 1940 grams of an aqueous solution of 1,2,4-trimethylpiperazine containing 33% by weight of trimethylpiperazine were added to a three-neck flask equipped with a stirrer, reflux condenser and thermometer well. The mixture was agitated under reflux conditions (93° to 95° C.) for 4.5 hours. After cooling to about 50° C., 10 grams of magnesium oxide were added thereto. A take-off head was attached to the condenser and the pressure within the reactor was reduced to 100 mm. of mercury. The reaction product mixture was distilled under this reduced pressure until the temperature of the distilland reached 63° C. The distillate consisted of water and volatile organic material. The distilland was cooled to room temperature and separated from undissolved magnesium oxide by filtration. The resulting solution contained about 90 to 94 percent of the theoretical amount of bromide ion based upon 2-methyl-1,4-diazabicyclo[2.2.2]octane dimethobromide.

The aqueous diquaternary dibromide solution was added to an aqueous nitric acid solution, 70% $HNO_3$, contained in a three-neck reactor flask equipped with a dropping funnel, stirrer and a downwardly extending column which terminated in a three-neck receiver flask immersed in an ice bath. A reflux condenser was mounted in the center neck. A tube extended from the top of the condenser into a filtering flask containing 1 liter of 20% caustic soda solution. The connecting tube extended below the surface of the caustic soda. The outlet of the filtering flask was connected to a scrubbing column. The reactor flask was charged with 1825 grams (20.25 mols) of 70% nitric acid and the acid was agitated at a temperature from 70° to 75° C. while the quaternary dibromide solution was added slowly through the dropping funnel over a thirty-minute time span. The oxidation products from the reaction, a mixture of bromine and oxides of nitrogen, were drawn off through the column. After the addition of the dibromide solution was completed, distillation was continued until the temperature of the distilland reached 125° C. The remaining pale yellow syrup was cooled with continued agitation to 40° C. and 1400 grams of methanol were added thereto. Cooling of the product was continued until the temperature thereof was between 10° and 15° C. and 600 grams of isopropanol were added thereto. A crystalline product precipitated from the solvent, was separated therefrom by filtration, washed with methanol and oven dried at 80° to 90° C. The product, 2-methyl-1,4-diazabicyclo[2.2.2]octane dimethonitrate, weighed 1080 grams corresponding to a conversion of 77% based upon 1,2,4-trimethylpiperazine and assayed at about 99.5%.

Example II

Employing the same reactants and reaction conditions as set forth in Example I except that 2560 grams of an aqueous solution containing 25% by weight of 1,2,4-trimethylpiperazine was used as an initial reactant in lieu of the 33% trimethylpiperazine solution, there was obtained 1050 grams of 2-methyl-1,4-diazabicyclo[2.2.2]octane dimethonitrate corresponding to a conversion of 75% based upon 1,2,4-trimethylpiperazine.

Example III

Employing the same reactants and reaction conditions as set forth in Example I except that 2150 grams of an aqueous solution containing 33% by weight of 2-ethyl-1,4-dimethylpiperazine was used as an initial reactant in lieu of the 33% trimethylpiperazine solution, there was obtained 705 grams of 2-ethyl-1,4-diazabicyclo[2.2.2]octane dimethonitrate corresponding to a conversion of 48% based upon the trialkylated piperazine.

Thus, new, effective, high conversion aqueous processes have been provided for preparing diquaternary dibromides, for purifying the aqueous diquaternary dibromide reaction product so that it is suitable for effective reaction with aqueous nitric acid, for reacting the aqueous dibromide reaction product with aqueous nitric acid, and a new over-all aqueous process has been provided for preparing diquaternary dinitrate salts based on 1,4-dialkylpiperazines.

We claim:

1. A process which comprises mixing and heating water, an alkyl-substituted piperazine according to the formula:

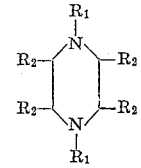

wherein $R_1$ is a member selected from the group consisting of methyl and ethyl radicals and $R_2$ is a member selected from the group consisting of hydrogen, methyl and ethyl radicals and at least two $R_2$ substituents are hydrogen radicals, and about the stoichiometric proportion of a 1,2-dihaloethane selected from the group consisting of ethylene dichloride and ethylene dibromide at a temperature from about 70° to 100° C.

2. A process, which comprises mixing and heating water, an alkyl-substituted piperazine according to the formula:

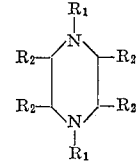

wherein $R_1$ is a member selected from the group consisting of methyl and ethyl radicals and $R_2$ is a member selected from the group consisting of hydrogen, methyl and ethyl radicals and at least two $R_2$ substituents are hydrogen radicals, and about the stoichiometric amount of a 1,2-dihaloethane selected from the group consisting of ethylene dichloride and ethylene dibromide at a temperature from about 70° to 100° C., there being about 7 to 30 mols of water per mol of said alkyl-substituted piperazine, and adding a metal oxide selected from the group consisting of magnesium oxide and calcium oxide thereto in an amount corresponding to about 0.1 to 2.0 percent of the weight of the aqueous reaction mixture.

3. A process, which comprises, heating and mixing water, an alkyl-substituted piperazine according to the formula:

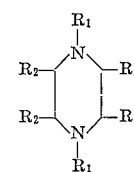

wherein $R_1$ is a member selected from the group consisting of methyl and ethyl radicals and $R_2$ is a member selected from the group consisting of hydrogen, methyl and ethyl radicals and at least two $R_2$ substituents are hydrogen radicals, with approximately the stoichiometric amount of a 1,2-dihaloethane selected from the group consisting of ethylene dichloride and ethylene dibromide at a temperature from about 70° to 100° C., there being from 7 to 30 mols of water per mol of said alkyl-substituted piperazine, and adding a metal oxide selected from the group consisting of magnesium oxide and calcium oxide thereto in an amount corresponding to about 0.1 to 2.0 percent of the weight of the aqueous reaction mixture, heating and distilling said aqueous reaction mixture at a pressure from about 25.0 to 250.0 mm. of mercury until the concentration of the solute in the distilland is from about 60 to 70 weight percent, separating undissolved metal oxide from the distilland, heating and mixing said distilland with an aqueous nitric acid solution having about 4 to 5 mols of nitric acid per mol of alkyl-substituted piperazine starting reactant and a nitric acid concentration of about 50 to 70 weight percent, based on the weight of said aqueous nitric acid solution, at a temperature from about 65° to 90° C., and heating and distilling the resulting reaction mixture until the temperature of the distilland reaches about 125° C. at atmospheric pressure.

4. A process in accordance with claim 3 wherein the alkyl-substituted piperazine is 1,4-dimethylpiperazine and the dihaloethane is ethylene dibromide.

5. A process in accordance with claim 3 wherein the alkyl-substituted piperazine is 1,4-diethyl-2-methylpiperazine and the dihaloethane is ethylene dibromide.

6. A process in accordance with claim 3 wherein the alkyl-substituted piperazine is 1,4-dimethyl-2-ethylpiperazine and the dihaloethane is ethylene dibromide.

7. A process in accordance with claim 3 wherein the alkyl-substituted piperazine is trans-1,2,4,5-tetramethylpiperazine and the dihaloethane is ethylene dibromide.

8. A process in accordance with claim 3 wherein the alkyl-substituted piperazine is 1,2,4,6-tetramethylpiperazine and the dihaloethane is ethylene dichloride.

9. A process which comprises heating and mixing water, 1,2,4-trimethylpiperazine and approximately the stoichiometric amount of a 1,2-dihaloethane selected from the group consisting of ethylene dichloride and ethylene dibromide at a temperature from about 70° to 100° C. to produce a diquaternary dihalide reaction product, there being about 7 to 30 mols of water per mol of said 1,2,4-trimethylpiperazine reactant and thereafter adding magnesium oxide thereto in an amount corresponding to about 0.1 to 2.0 percent of the weight of the aqueous reaction mixture, heating and distilling the aqueous reaction mixture at a pressure from about 25.0 mm. of mercury up to about atmospheric pressure until the concentration of the solute in the distilland is about 60 to 70 weight percent, separating undissolved magnesium oxide from the distilland, heating and mixing said distilland with an aqueous nitric acid solution having about 3.5 to 6 mols of nitric acid per mol of trimethylpiperazine starting reactant and a nitric acid concentration of 50 to 70 weight percent, based on the weight of aqueous nitric acid solution, at a temperature from about 70° to 80° C., heating and distilling the resulting reaction mixture until the temperature of the distalland reaches about 125° C. at atmospheric pressure, cooling the distilland to a temperature slightly below the boiling point of a solvent-liquid precipitant, adding a solvent-liquid precipitant thereto and continuing to cool to produce crystals of purified 2-methyl-1,4-diazabicyclo[2.2.2]octane dimethonitrate.

10. A process in accordance with claim 9 wherein the dihaloethane is ethylene dibromide.

11. A process which comprises heating and mixing water, 1,2,4-trimethylpiperazine and approximately the stoichiometric amount of a 1,2-dihaloethane selected from the group consisting of ethylene dichloride and ethylene dibromide at a temperature from about 70° to 100° C. to produce a diquaternary dihalide reaction product, there being about 7 to 30 mols of water per mol of said 1,2,4-trimethylpiperazine reactant and thereafter adding magnesium oxide thereto in an amount corresponding to about 0.1 to 2.0 percent of the weight of the aqueous reaction mixture, heating and distilling the aqueous reaction mixture at a pressure from about 25.0 mm. of mercury up to about atmospheric pressure until the concentration of the solute in the distilland is about 60 to 70 weight percent, separating undissolved magnesium oxide from the distilland, heating and mixing said distilland with an aqueous nitric acid solution having about 3.5 to 6 mols of nitric acid per mol of trimethylpiperazine starting reactant and a nitric acid concentration of 50 to 70 weight percent, based on the weight of aqueous nitric acid solution at a temperature from about 70° to 80° C., heating and distilling the resulting reaction mixture until the temperature of the distilland reaches about 125° C. at atmospheric pressure, cooling the distilland to a temperature slightly below the boiling point of isopropanol, adding to the cooled distilland methanol to dissolve the distilland, adding isopropanol to and cooling to below about 10° C. the methanol solution of the distilland to precipitate crystals of 2-methyl-1,4-diazabicyclo[2.2.2]octane dimethonitrate, the total amount of methanol and isopropanol used being at least 300 grams per mol of said diquaternary dibromide reaction product, there being about 70 weight percent methanol and about 30 weight percent isopropanol in the methanol and isopropanol used based on the combined weight of methanol and isopropanol.

References Cited in the file of this patent

F. G. Mann et al.: Journal Chemical Society (London), part III, pages 2298–2302 (1949).

F. G. Mann et al.: Journal Chemical Society (London), part IV, pages 4476–4480 (1954).